United States Patent [19]

Jones

[11] 4,355,516

[45] Oct. 26, 1982

[54] THERMODYNAMIC MOTOR AND PULLEY SYSTEM

[76] Inventor: Charles V. Jones, 539 Missimer La., Vinton, Va. 24179

[21] Appl. No.: 137,064

[22] Filed: Apr. 3, 1980

[51] Int. Cl.³ .............................................. F03G 3/00
[52] U.S. Cl. ....................................... 60/675; 60/531
[58] Field of Search .................................. 60/531, 675

[56] References Cited

U.S. PATENT DOCUMENTS

| | | | |
|---|---|---|---|
| 2,513,692 | 7/1950 | Tubbs | 60/531 |
| 3,984,985 | 10/1976 | Lapeyre | 60/675 X |
| 4,195,483 | 4/1980 | Myers et al. | 60/530 |

*Primary Examiner*—Allen M. Ostrager

*Attorney, Agent, or Firm*—Griffin, Branigan & Butler

[57] ABSTRACT

A thermodynamic motor has a pulley belt (47) extending semi-circumferentially around a frame (21) for ultimately transmitting the rotational motion of the frame (21) to a rotationally driven unit (49). In differing embodiments the thermodynamic motor comprises containers (33, 333, 334, 335) which are shaped to facilitate the rapid and substantially uniform vaporization of a volatile liquid substance (37) contained therein. Further embodiments described herein include those utilizing detachable containers; cooling means (123) to hasten condensation of the volatile liquid (37); and, a thermostatic control system for maintaining a temperature differential between the containers in each pair.

11 Claims, 11 Drawing Figures

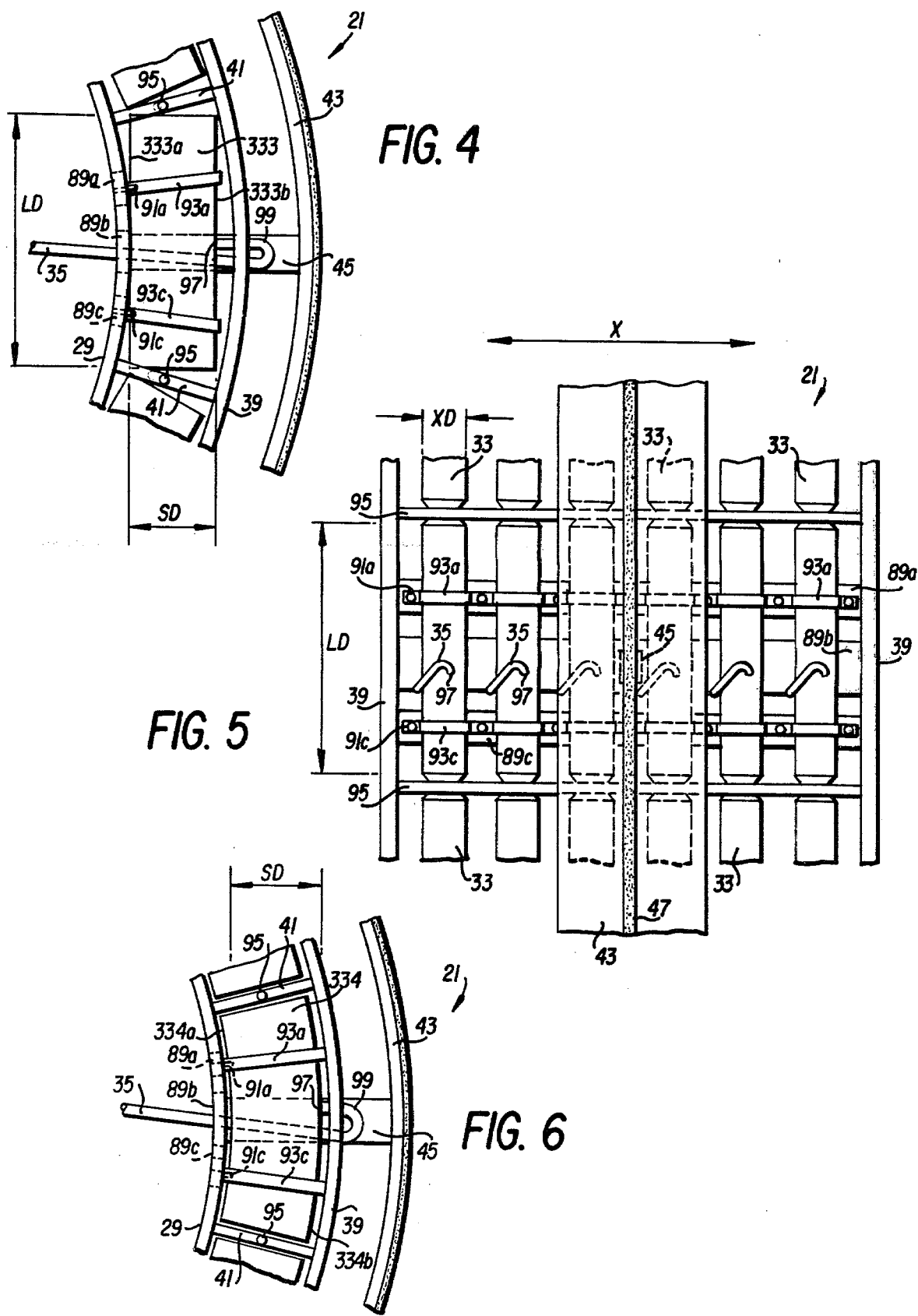

THERMODYNAMIC MOTOR AND PULLEY SYSTEM

BACKGROUND

This invention pertains to thermodynamic motors of a type having a plurality of pairs of containers mounted near the circumference of a vertically erect, rotatable frame. The containers of each pair are oppositely disposed around an axial shaft of the frame and are interconnected by a hollow tube to permit the transfer of a volatile liquid substance between the containers. When a container passes through a lower portion of the frame's path of rotation, the volatile liquid in the container is vaporized by an appropriate heating means. The vapor ascends through the connecting tube to an elevated container paired therewith. The volatile substance in the elevated container then condenses, providing a greater gravitational attraction and thus imparting rotational motion to the frame. Prior art motors of this type are illustrated in numerous United States patents, including various patents to Iske et al. Nos. (242,454; 243,909; and, 389,515), Avery (3,509,716), and Brown (3,659,416).

Most prior art thermodynamic motors have connections to the axial shaft of the frame for transmitting the rotational motion produced by the motor. The connections may take the form of belts, gears, or the like. However, taking the rotational motion produced by the motor from the axial shaft provides no practical way of stepping-up the motor's rotational velocity.

Prior art thermodynamic motors prove impractical for many usages, including the driving of an electrical generator. In this respect, it is dubious that prior art thermodynamic motors rotated at more than a few revolutions per minute. Moreover, prior art devices made no provision for controlling the rotational velocity of the thermodynamic motor. A controlled rotational velocity is particularly significant when driving an electrical generator or alternator which typically must be driven within a prescribed range of revolutions per minute.

A thermodynamic motor should achieve a high rotational velocity without significant energy expenditure. Factors influencing the rotational velocity of the motor frame include both the speed of the vaporization and condensation processes and the mass of the volatile condensed liquid acted upon by gravity to produce the rotational force.

In the above regard, the speed of the vaporization and condensation processes depend on such factors as (1) the amount of heat and time required for the vaporization of the volatile liquid in each container; (2) how quickly the volatile liquid in each container can be cooled; and, (3) the distance of travel through the tube interconnecting the pair of containers. Hence, it is desirable to have a container in which the volatile liquid can be quickly and uniformly vaporized and yet contain a sufficient mass for gravitational attraction. Prior art containers, generally spherical or cylindrical in shape, have proved unsatisfactory because of the limited surface area of the container per mass of liquid contained therein.

With further reference to the above, prior art containers have also been mounted near the circumference of the frame by separating adjacent containers at a distance greater than the distance between their centers of gravity. Mounting in this manner necessitates a larger radius for the frame for a given mass of liquid in the system. The larger frame, in turn, requires a longer distance of travel through the tubes interconnecting the pairs of containers.

Other problems arise when using the prior art containers and the tubes interconnecting them. For example, a container may eventually leak. Prior art containers appear to be fabricated from glass or the like so that visual inspection would indicate the occurrence and location of a leak. However, unlike the prior art containers, efficient containers must not retain heat, which usually necessitates construction of the containers from materials which are opaque. Nevertheless, in a complex system having numerous efficient yet opaque containers and requiring a delicate mass balance around the frame, it is virtually impossible to determine which container has leaked. Further, even when it has been determined that a container leaks, the associated structure of the prior art devices have impeded the detachment of the defective container for subsequent repair or replacement.

Many prior art thermodynamic motor systems depict the tubes interconnecting the containers as being substantially straight, even in a neighborhood where the tube intersects the container. Unfortunately, an essentially straight tube permits the force of gravity to prematurely draw the condensed liquid in the elevated container downwardly into the opposite container of the pair before the container with the condensed liquid reaches the heating means. As a result, the condensed container is not full of liquid when heated and the system loses efficiency. Some prior art systems have attempted to rectify this problem by running a straight tube substantially through the interior of the container so that it extends above the full level of the condensed liquid in the container. The extension of the tube through the container, however, results in an efficiency loss by reducing the volume of the container available for liquid.

Therefore, an object of this invention is to provide a thermodynamic motor system suitable for transmitting and stepping-up the rotational velocity of the thermodynamic motor for driving other systems, including an electric generator.

The invention advantageously provides numerous embodiments of containers in which volatile liquid substances can be quickly and uniformly vaporized or condensed.

Further, the invention advantageously provides a means for determining when a container leaks, as well as means for easily detaching containers for subsequent repair or replacement.

Furthermore, the invention provides a thermodynamic motor system advantageously employing means to monitor and adjust the temperature differential between various parts thereof, thereby controlling the rotational velocity of the motor.

SUMMARY OF THE INVENTION

A thermodynamic motor system has a first pulley belt extending semi-circumferentially around a thermodynamic motor frame for ultimately transmitting the rotational motion of the frame to a rotationally driven unit. In ultimately connecting the motor frame to the driven unit, the first pulley belt also extends around a first intermediate pulley. The intermediate pulley has a significantly smaller diameter than the motor frame so that the first pulley belt imparts a second rotational velocity greater than that of the motor frame to the first intermediate pulley. Integral with the first intermediate pulley is a second intermediate pulley having a larger diameter than the first intermediate pulley. The second intermediate pulley is semi-circumferentially surrounded by a second pulley belt which imparts the greater rotational velocity (either directly or through a series of further intermediate pulleys) to the rotationally driven unit. In this manner the rotational velocity of the frame is stepped-up to achieve an increased rotational velocity sufficient to drive the unit.

In differing embodiments the thermodynamic motor comprises containers which are shaped to facilitate the rapid and uniform vaporization and condensation of a volatile liquid substance contained therein. In this regard, the containers provided in the differing embodiments provide a greater surface area per mass of liquid for each container than exists in prior art containers.

In one embodiment, the containers are essentially elongated rectangles having square, vertical cross-sections. The containers extend substantially entirely across an axial direction of the motor frame.

In a second embodiment, the containers are essentially rectangular in vertical cross-section and are oriented so that a larger rectangular dimension lies along a tangent to the circumference of the frame.

In a third embodiment, the containers resemble those of the second embodiment described above, but are arcuate along the larger rectangle dimension, thereby approximating the curvature of the frame.

According to a further related embodiment, a plurality of containers according to any of the foregoing embodiments are mounted in a spaced-apart relation across the axial direction of the frame.

As discussed with respect to both second and third embodiments, the largest dimension of the container lies along the path of travel of the frame, thereby exposing more surface area to the heating means for a longer period of time. Moreover, containers of these embodiments may be contiguously mounted around the circumference of the frame, thus reducing what would otherwise be a larger frame circumference. Further, when the heating means comprises a body of liquid or the like, the containers of these embodiments require less depth of liquid and hence less energy to heat the liquid.

The pairs of containers described with reference to any of the preceding embodiments are, according to yet another embodiment, interconnected by a tube which travels around the container to connect to a surface of the container furthest from the axis of the frame. Connection of the tube in this manner precludes the force of gravity from prematurely draining condensed liquid from an elevated container.

In a embodiment related to that described immediately above, the interconnecting tube is provided with a transparent tube section in a neighborhood of the connection to the container. The transparent tube section has visibly marked thereon a scale or mark for indicating the level of the volatile liquid filling each container.

In a further embodiment, containers, such as those summarized above, are selectively strapped on to the frame to facilitate detachment of the containers. This embodiment is especially useful when detaching a container for subsequent repair or replacement in instances of a leak, for example.

Additional embodiments are broadly summarized as concerning the heating means for vaporization, cooling means used to hasten condensation, and blowing means used to direct a column of air to act as a thermal boundary. A thermostatic control monitoring the heating means and the cooling means adjusts the temperature differential therebetween, thereby controlling the rotational velocity of the motor.

BRIEF DESCRIPTION OF THE DRAWINGS

The foregoing and other objects, features, and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating principles of the invention.

FIG. 4 is an enlarged view of a portion of FIG. 1;

FIG. 5 is a side view of FIG. 4;

FIG. 6 is a variation of FIG. 4 according to another embodiment of the invention;

DETAILED DESCRIPTION OF THE DRAWINGS

Figure 1:
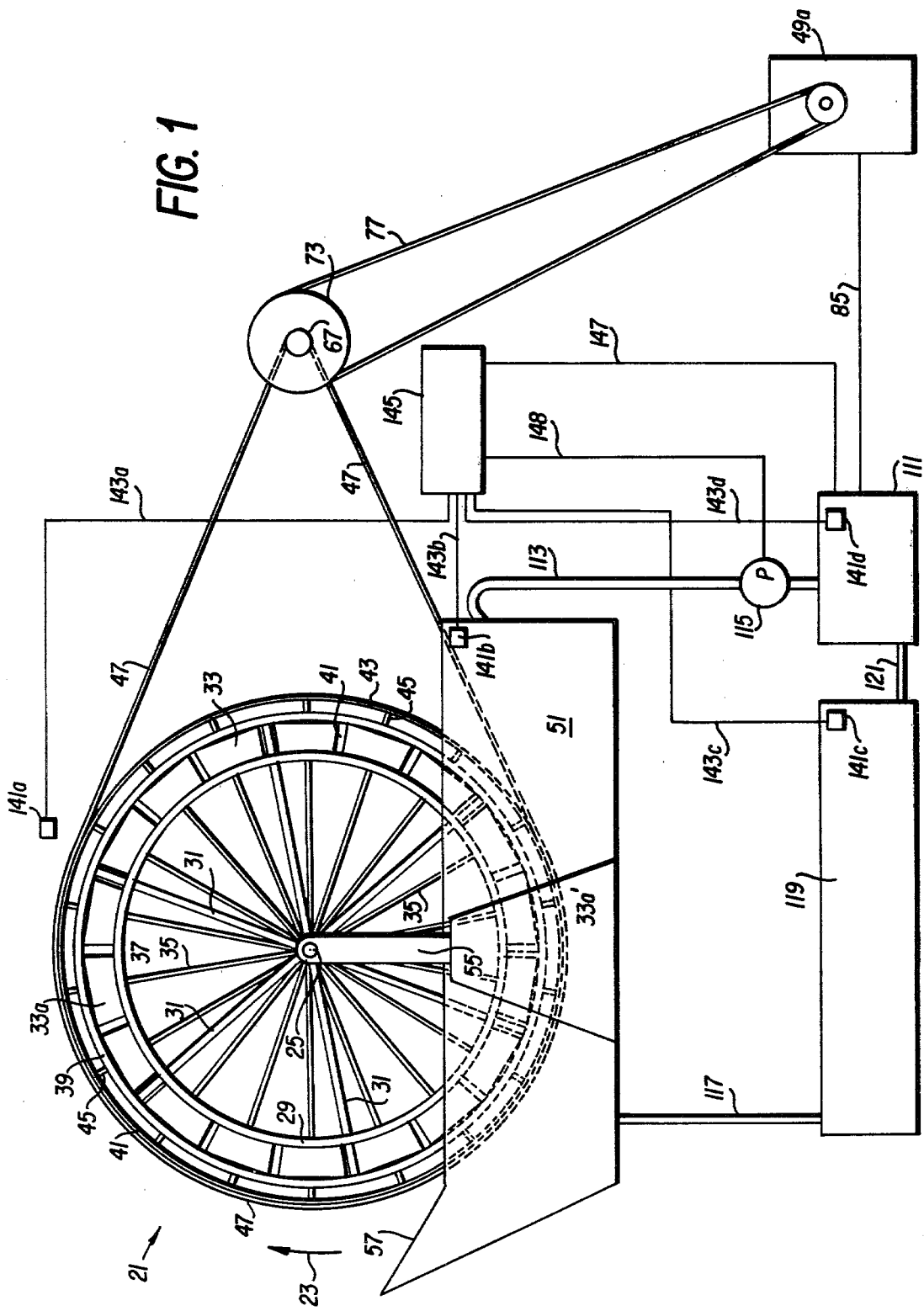
FIG. 1 is an end view of a thermodynamic motor and pulley system according to one embodiment of the invention.

FIG. 1 illustrates a thermodynamic motor and pulley system and, in particular, one end of a motor frame 21. The frame 21 is essentially cylindrical and is oriented so that a vertical cross-section of the frame 21 is in the plane of the paper of FIG. 1. The frame 21 is adapted to rotate in a circumferential direction (as shown by arrow 23) about a horizontal axis 25 extending through the center of the cylindrical frame 21. In this respect, the horizontal axis 25 is perpendicular to the plane of the paper and coincident with an axle 27 (see FIG. 2). Thus, as used hereinafter, the term "axial direction" is the direction perpendicular to the plane of paper of FIGS. 1, 4, 6, and 7 and labelled elsewhere as "X".

The motor frame 21 comprises an essentially cylindrical inner frame member 29 which also has as its center the horizontal axis 25. At each end the inner frame member 29 is bridged by a plurality of spokes 31 each of which are connected to the axle 27.

Mounted around the outer circumference of the inner frame 29 are an even number of containers 33. Each container 33 is fabricated from a material, such as aluminum for example, which does not retain heat. As explained hereinafter, the shape of the containers 33 differ according to the particular embodiment of the invention utilized. In all embodiments, however, each container 33 is paired with a companion container disposed directly opposite on the frame 21. For example, as seen in FIG. 1, elevated container 33a is paired with container 33a'. Each pair of containers is connected across the diameter of the frame 21 by at least one hollow interconnecting tube 35 which passes near the axis 25.

Each pair of containers 33 and tube 35 interconnecting them forms a sealed vacuum system containing a sufficient amount of a volatile liquid substance (generally indicated as 37) to fill at least one of the containers and a sufficient amount of vapor of the same substance to fill the companion container and the tube 35. In selecting a volatile liquid substance it is desirable to choose a substance which has the best combination of a low vaporization temperature, a relatively heavy volumetric weight, and the least amount of energy required to produce a change in state (from liquid to vapor or vice versa). One example of such a substance is Freon 116 which has a critical temperature for vaporization at about −196° F.

The motor frame 21 also has at each end an outer frame member 39 which is also concentric with respect to the inner frame member 29 and the axle 27. At each end of the frame 21 the outer frame member 39 may be mounted on the inner frame member 29 by a series of radial braces 41 or, as hereinafter described, may be directly mounted on the containers 33.

A pulley groove 43 concentric with outer frame member 39, inner frame member 29, and the axle 27 is mounted on the motor frame 21. As explained below, the pulley groove 43 is attached to motor frame 21 by a series of radially extending groove mounting studs 45. The groove mounting studs 45 space the pulley groove 43 sufficiently away from the frame 21 and the containers 33 mounted thereon so that a paddle-wheel effect will not occur. A pulley belt 47 extends semi-circumferentially around the pulley groove 43 and is ultimately connected to a rotationally driven unit, such as generator or alternator 49a. The pulley belt 47 may be, for example, a synthetic V-belt resistant to hot water.

As previously indicated, thermodynamic motors must have a means to effect a temperature differential between communicating containers 33 in a pair. One component for creating such an effect is a heating means, exemplified as a body of hot water 51 contained in a tub 53.

The motor frame 51 is suspended above the tub 53 by a pair of vertical supports 55. Each support 55 engages one end of the axle 27 so as to permit the axle 27 and the motor frame 21 integral therewith to rotate. The supports 55 are adjustable in vertical height to permit a lower portion of the frame 21 to be immersed in the hot water 51. In this regard, the frame 21 is suspended on supports 55 so that the containers 33 are sequentially submerged in the hot water 51 as the frame 21 rotates in the circumferential direction 23. The vertical height of the tub 53 is a function both of the size of the containers 33 and the temperature of the water 51. That is, the hotter the water 51 the less time exposure the containers 33 need for vaporization. Thus, the hotter the water 51 the smaller the arc indicated by the dotted lines in FIG. 1 (for outlining a submerged portion of the frame 21) needs to be.

In view of the foregoing, tub 53 is preferably thermally insulated. Moreover, the tub 53 is provided with a lip portion 57 adapted to catch water which may splash or drain from the frame 21 as it emerges from the body of water 51.

As indicated above, the pulley belt 47 extends in a semi-circumferential manner around the pulley groove 43 and ultimately connects to a rotationally driven unit 49. As illustrated in FIG. 1, the pulley belt 47 engages a first intermediate pulley 67. The diameter of the pulley 67 is significantly smaller than the diameter of the pulley groove 43.

Figure 10:
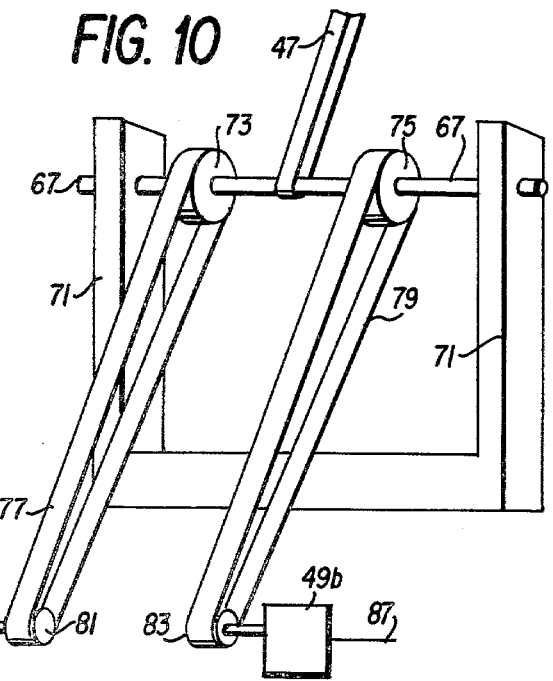
FIG. 10 is a perspective view of an intermediate pulley system according to one embodiment of the invention; and, FIG. 11 is a partial end view of FIG. 1 additionally showing a cooling means and a collecting means.

As seen in FIG. 10, the pulley 67 is mounted in a U-shaped support 71. Two pulleys 73 and 75 of greater dimension than the pulley 67 are mounted integral with pulley 67 so as to rotate at the velocity of the pulley 67. Pulley 73 is connected by a pulley belt 77 to a first rotationally driven unit 49a, and pulley 75 is connected by a pulley belt 79 to a second rotationally driven unit 49b.

The rotationally driven units 49a and 49b are illustrated as electric generators having armature shafts 81 and 83, respectively, which are driven by the pulley belts 77 and 79. In the FIG. 10 illustration unit 49a is used to supply power via line 85 back to the thermodynamic system (for the operation of pumps, the heating of water, or the like). The unit 49b supplies surplus electric power via line 87 for whatever purpose a user may desire.

Figure 3:
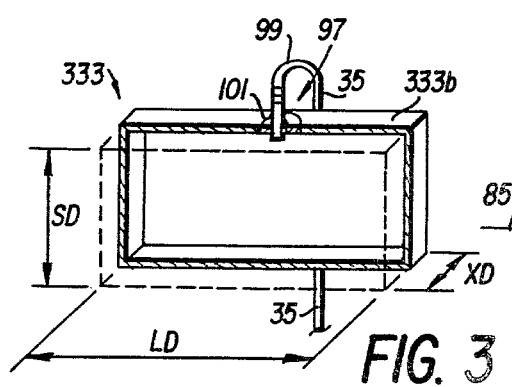
FIG. 3 is a perspective cross-sectional view of a container according to one embodiment of the invention having a cut-away portion indicated by dotted lines.

In its differing embodiments the thermodynamic motor comprises containers 33 which are shaped to facilitate the rapid and substantially uniform vaporization and condensation of the volatile liquid substance 37 contained therein. FIGS. 3, 4, and 5 illustrate one such embodiment, a container 333 having an essentially rectangular vertical cross-section.

The container 333 is oriented on the frame 21 so that a larger dimension LD of its vertical rectangular cross-section is essentially tangential to the outer circumference of the inner frame member 29. A smaller dimension SD is oriented essentially orthogonally to the larger dimension LD. The ratio of the lengths of LD to SD is between 3:1 and 1:1, 2:1 being preferred.

In addition to showing the larger dimension LD and the smaller dimension SD of the container 333, FIG. 3 further shows an axial dimension XD of the container 333 along the axial direction X. The ratio of the lengths of the axial dimension XD of container 333 to its smaller dimension SD is between 1:5 and 1:15, 1:12 being preferred. The ratio of the lengths of the axial dimension XD of container 333 to its larger dimension LD is between 1:15 and 1:30, 1:24 being preferred.

As seen in FIGS. 4 and 5, the inner frame member 29 comprises a plurality of horizontal ribs 89a, 89b, and 89c between adjacent radial braces 41. The horizontal ribs 89 run in the axial direction from one end of the frame 21 to the other. Two of the horizontal ribs (89a and 89c) have affixed thereto by fasteners (91a and 91c, respectively) a strapping means (93a and 93c, respectively).

The container 333 is mounted in the frame 21 so that the larger dimension LD thereof is essentially tangential to the outer circumference of the inner frame member 29. The strapping means 93 are then placed around the container 333 to secure it to the horizontal ribs 89, and thus to the inner frame member 29. Retaining rods 95 span the axial direction X between the radial braces 41 at each end of the frame to which the rods 95 are attached. The retaining rods 95 prevent circumferential slippage of the containers 33 as the frame 21 rotates.

In the above regard, while three horizontal ribs 89 and two straps 93a and 93c have been illustrated in FIGS. 4 and 5, it should be understood that the number of ribs and straps may be varied. For example, horizontal rib 89b attached to the inner frame member 29 has affixed thereon the pulley groove mounting stud 45 which supports the pulley groove 43. Since the number of mounting studs 45 does not necessarily have to equal the number of containers 333 positioned around the circumference of the frame 21, the horizontal ribs 89b may be spaced around the inner frame member 29 in any suitable pattern.

From FIGS. 4 and 6 it can be seen that containers 333 and 334 are positioned contiguously around the outer circumference of the inner frame member 29. This facilitates a smaller frame 21, which is advantageous for reasons discussed above.

In addition to illustrating the shape of the container 333, FIGS. 3, 4, and 5 also show the intersection of the container 333 with the interconnecting tube 35. Rather than intersect the container 333 at a first surface 333a which is the closest surface to the axis 25 which which abuts the inner frame member 29, the tube intersects the container 333 at a second surface 333b which is oppositely disposed and parallel to the plane of surface 333a. Thus, in travelling to the container 333 from the axis 25, the tube 35 travels around the container 333 to a point of intersection 97 on the surface 333b. In so travelling, the tube 35 has a crook 99. Intersection of the tube 35 on surface 333b of the container 333 precludes the force of gravity from prematurely emptying the container 333 when the container is in an elevated position on the frame 21.

Instead of having an essentially rectangular cross-section, a container 334 of the embodiment depicted in FIG. 6 has essentially crescent-shaped surfaces 334a and 334b which approximate the curvatures of the inner frame member 29 and the outer frame member 39, respectively. In this respect, in vertical cross-section surface 334a appears as a first arc having a radius approximating that of the inner frame member 29 and surface 334b appears as a second arc having a radius approximating the radius of the outer frame member 39. In applying the ratios given for the preceding embodiment to this embodiment, the larger dimension LD of container 334 is the average of the two arc lengths and the smaller dimension SD is the perpendicular distance separating the two arcs.

A plurality of containers 333 or 334 (generally designated as 33) are mounted in side-by-side relation along the axial direction X of FIG. 5. Each of the containers 33 is secured to the horizontal ribs 89 by the strapping means 93. Depending upon the expanse of the frame 21 in the axial direction X, and upon the axial dimension XD of each of the containers 33, the number of containers 33 placed along the axial direction X is variable. Adjacent containers 33 are spaced apart in the axial direction X to allow room for the interconnecting tube 35 to pass between them in route to the other container in each container pair.

From FIG. 5 it is observed that the containers 33 may be unstrapped and detached from the frame 21 by removing them in a radial direction (out of the plane of the paper of FIG. 5). Inasmuch as two of the containers 33 are under the pulley groove 43, however, it is necessary only to remove one or more adjacent containers 33 in the manner just described; unstrap the container 33 which is located under the pulley groove 43; displace the unstrapped container 33 in the axial direction X from under the pulley groove 43; and, extract the displaced container 33 in the radial direction.

Figure 7:
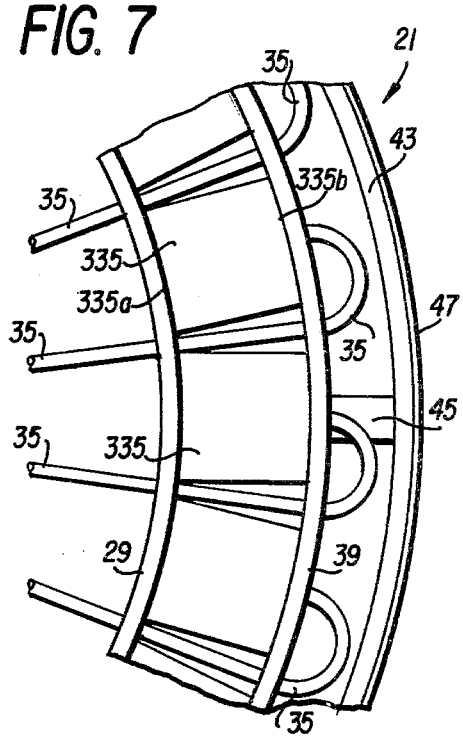
FIG. 7 is a variation of FIG. 4 according to yet another embodiment of the invention.
Figure 8:
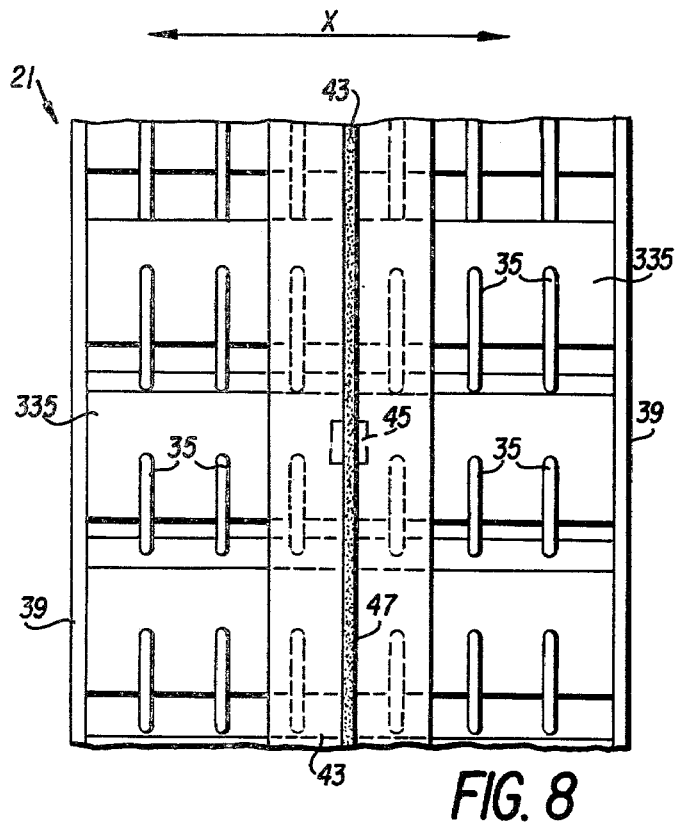
FIG. 8 is a side view of FIG. 7.

Another container embodiment is illustrated as container 335 in FIGS. 7 and 8. In vertical cross-section the containers 335 are essentially square in shape. A series of square containers 335 may be spaced apart on the frame 21 across the axial direction X as described with reference to the preceding container embodiments 333 and 334; or, the containers 335 may be elongate rectangles extending substantially across the entire axial direction X of the frame 21. In this latter instance, each container 335 may be provided with a plurality of tubes 35 connecting the container 335 with its companion in the pair. In order to connect the tubes 35 to the container 335 on a container surface 335b furtherest from the axis 25, and for the tubes 35 to travel around the container 335 as described hereinbefore, the adjacent containers 335 must be slightly spaced apart around the circumference of the inner frame member 29 in order to permit passage of the tube 35 between adjacent containers.

In the above regard, when using a plurality of tubes 35, either with reference to this embodiment or any other embodiment described herein, tubes 35 on adjacent containers may be staggered either across the axial direction X (although not shown as such in FIG. 8) or any other direction. Staggering of the tubes 35 enables them to pass more closely to the axis 25 without detouring around neighboring tubes. In all embodiments, all tubes 35 must be substantially of the same length.

While the containers 335 may be strapped to the inner frame member 29 in the manner of the previously described containers 333 and 334, FIGS. 7 and 8 illustrate the containers 335 as being welded to the inner frame member 29 and the outer frame member 39. Naturally, the containers 335 may be affixed by other fastening means. The mounting stud 45 depicted in FIGS. 7 and 8 is directly secured (welded or the like) to the container 335.

Containers having any of the shapes described above provide more exposed surface area and hence promote a faster rate of heat gain or heat loss. Further, with reference to the containers 333 and 334, the narrowness of the containers along their axial dimension XD promotes a more uniform heating of the volatile liquid substance 37 contained in the containers. Moreover, orienting the containers so that its largest dimension lies along the path of rotation of the frame 21 provides an increased exposure time and an increased exposed surface area for the container.

The interconnecting tubes 35 are fabricated from a material which will not absorb or retain heat, such as aluminum, for example. As described above, the tube 35 adjoins the container 35 at the appropriate container surface such as 333b, 334b, or 335b, as shown in FIGS. 4, 6, and 7, respectively.

Figure 9:
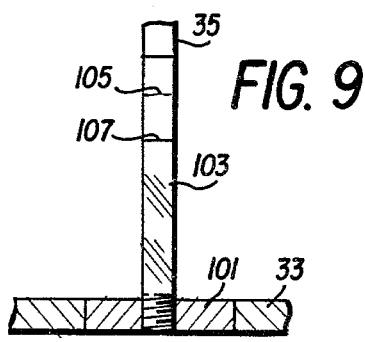
FIG. 9 is an enlarged view of a portion of FIG. 3.

As shown in FIG. 9, the tube 35 is threadingly engaged with a fitting 101. A sealant impervious to the volatile substance is applied between the threaded portions of the tube 35 and the fitting 101 to prevent leaks. The fitting 101 is inserted into the container 33. While not illustrated, it should be understood that the tube 35 may also be welded to the container 33.

In a further embodiment, the tube 35 comprises a transparent portion 103 comprised of clear plastic tubing or the like. Through the transparent tubing 103 it is possible to see the level (generally indicated as 105) of volatile liquid substance 37 contained in the container 33. The transparent tubing 103 bears a marking 107 indicative of the desired liquid level for the container 33. In this respect, the marking 107 may be a singular red ring, for example, or even a series of gradations on a scale.

The body of hot water 51 contained in the tub 53 has already been mentioned as one of the means to effect a temperature differential between an elevated and a submerged container 33. As seen in FIG. 1, the tube 53 is supplied with hot water from a source of hot water 111. An appropriate pipe 113 connects the hot water source 111 to the tub 53. Depending on the particular configuration employed, a pump 115 may be connected along the pipe 113 to insure adequate pressure.

In the above regard, the souce of hot water 111 may be a hot water heater powered by coal, gas, solar energy, or electricity. As shown in FIG. 1, the source of hot water 111 is heated by an electrical current supplied along line 85 from the rotationally driven unit 49a.

As the hot water 51 in tub 53 cools, a portion thereof is drawn through a pipe 117 to a storage tank 119. Ideally, the storage tank 119 is a solar heated reservoir. The storage tank 119 feeds the source of hot water 111 through a pipe 121.

Figure 2:
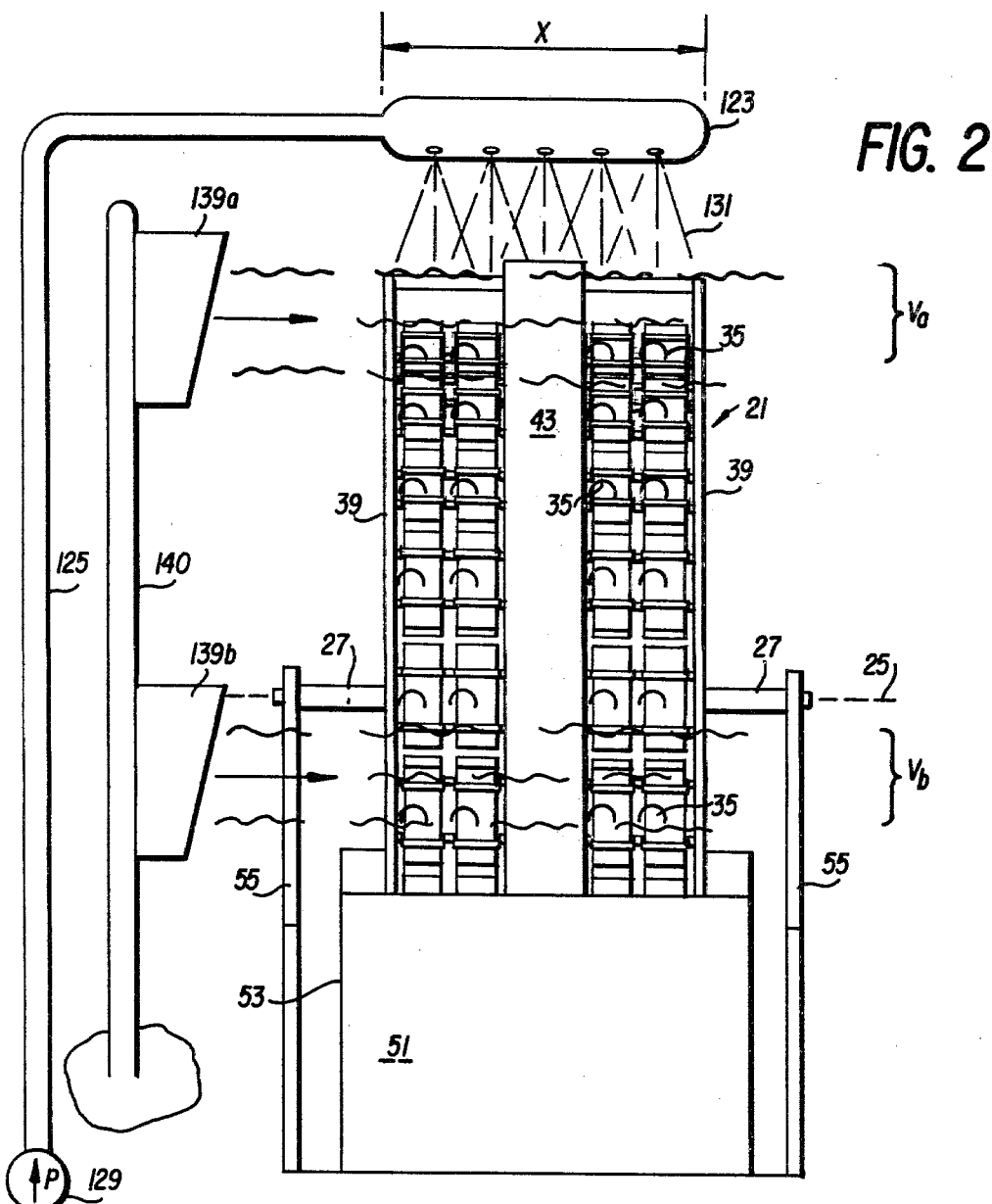
FIG. 2 is a side view of a thermodynamic motor and pulley system according an embodiment of the invention.

FIG. 2 illustrates an additional embodiment in which the means to effect a temperature differential further comprises a cooling means, such as a sprayer 123 located vertically above the motor frame 21. The sprayer 123 is supplied with cool water along an appropriate pipe such as conduit 125. In this respect, the source of cool water is preferably a subterreanean reservoir 127 from which the cool water is drawn by a pump 129 through the conduit 125.

Figure 11:
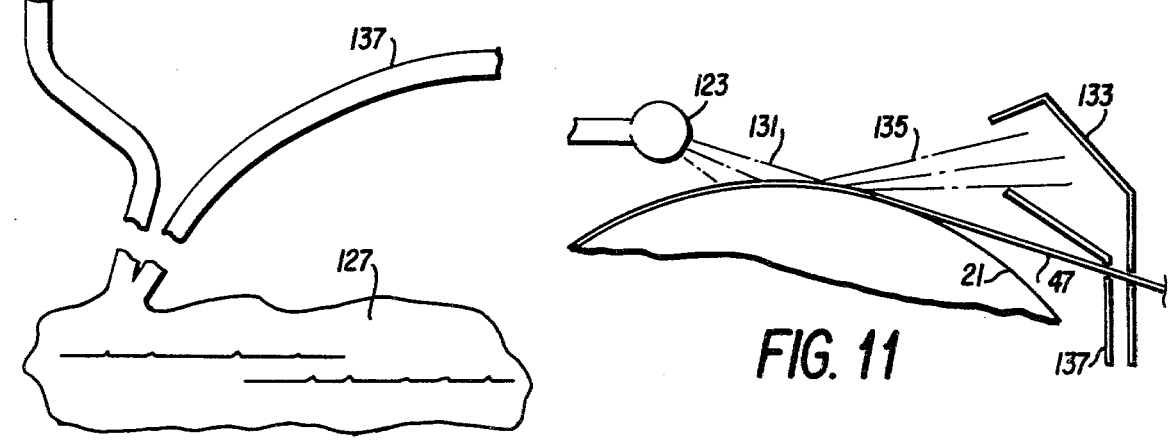

As additionally shown in FIG. 11, the sprayer 123 is oriented to the side and above the frame 21 so that the cool water spray 131 is practically tangentially incident to the circumference of the frame 21 for spraying only those containers 33 which are near the point of highest vertical elevation. In this respect, since FIGS. 2 and 11 basically incorporate either of the containers of FIGS. 4 or 6, it is to be understood that the spray 131 is oriented substantially parallel to the longer dimension LD of the containers 333 or 334. If, on the other hand, containers 335 of FIGS. 7 and 8 are to be cooled in this manner, the sprayer 123 would be located at one end of the frame 21 for spraying along the greater surface area (along the axial direction X) of the container 335.

Whatever embodiment of container is utilized, a collecting means 133 is positioned across from the spraying means 123 for collecting the deflected liquid spray 135 and for returning the same by gravity via a conduit 137 to the supply of cool water 127.

A number of thermal sensors 141 may be stationed at various positions around the thermodynamic motor structure. For example, sensor 141a is positioned slightly above the motor frame 21; sensor 141b is stationed in the body of hot water 51 contained in the tube 53; sensor 141c is stationed in the storage tank 119; and, sensor 141d is stationed in the source of hot water 111. Each of the sensors 141 is connected by suitable respective wires 143 to a programmable thermostatic control 145, such as a microprocessor. The thermostatic control 145 is in turn connected via wire 147 to the source of hot water 111 and, when utilized, via wire 148 to pump 115.

Since it is desirable to keep the heat produced at the heating means (the hot liquid 51 in tub 53) from rising vertically to heat the elevated containers 33 at the top of the motor frame 21, and likewise desirable to prevent the cool air produced by the cooling means (sprayer 123) from descending vertically into the neighborhood of the heating means, blowing means, such as fans 139a and 139b, are positioned near the top of the top and bottom of the motor frame 21, respectively. That is, the fan 139a is positioned beneath the srpayer 123 for directing a column of air beneath the sprayer 123 in the axial direction X. The column of air precludes the air cooled by the sprayer 123 from vertically descending. In like manner, the fan 139b is positioned above the tub 53 for directing a second column of air across the top of the tub 53 in the axial direction X thereby precluding the heat contained in the tub 53 from vertically ascending. Thus, the fans 139a and 139b serve as thermal bumpers to isolate temperature regions.

As shown in FIG. 2, the fans 139a and 139b may be mounted on any suitable support means, such as a stand 140. Further, appropriate vents Va and Vb are, one embodiment, positioned directly across in the axial direction X from the fans 139a and 139b respectively. The vents Va and Vb serve as exhausts and prevent undue condensation from collecting in the operating region of the thermodynamic motor.

In operation, the body of hot water 51 contained in the tub 53 heats the containers 33 as they become immersed therein. In this respect, the containers 334 and 335 (two of the embodiments discussed above) have their larger rectangular dimensions LD oriented along the circumferential path of travel 23 so that the larger dimension LD is immersed for a longer period of time. Further, the narrow axial dimension XD of the containers permit a quick, uniform heating of the volatile liquid substance 37 contained therein.

When the volatile liquid substance 37 vaporizes in an immersed container, such as container 33a', the vapor travels through the interconnecting tube 35 to the companion container 33a paired therewith. At this point, the companion container 33a is elevated above the axis 25. In one embodiment, the container 33a is then cooled by a cooling means, such as the sprayer 123 of FIG. 2, in order to promote condensation of the liquid substance 37. Once condensation occurs, the condensed liquid substance 37 does not immediately fall by gravitation back through the hollow interconnecting tube 35 as in prior art containers, but remains for reasons aforedescribed confined in the elevated container 33a so that gravity may attract the entire mass of the container around the circumferential path of motion 23. The vaporization/condensation process just described for containers 33a' and 33a occurs for each pair of containers positioned around the motor frame 21.

As the motor frame 21 rotates due to the vaporization/condensation process just described, the pulley belt 47 mounted on the motor frame 21 rotates with the rotational velocity of the motor frame 21. Since the pulley belt 47 is also connected to the intermediate pulley 67, and since the pulley 67 has a significantly smaller diameter than the motor frame 21, the first intermediate pulley 67 and the larger diameter pulleys 73 and 75 integral therewith rotate at a much faster rotational velocity. Through pulley belts 77 and 79, respectively, the pulleys 73 and 75 in turn impart an even greater rotational velocity to to the relatively smaller diameter shafts 81 and 83 of the rotationally driven units 49a and 49b, respectively.

the unit 49a may be an electrical alternator, generator or the like designed to apply a portion of the power generated by the thermodynamic motor back as input for operating the motor. The remainder of the power generated by the motor is available via unit 49b to operate whatever devices the user may desire, including electrical equipment. During the user's offpeak periods power produced by the wheel may be used to maintain the motor functions (such as heating water which may be stored for peak periods).

The temperature of the hot water 51 in the tub 53 is continually monitored by the sensor 141b. Simultaneously sensor 141a monitors the temperature of the air at the top of the frame 21. Signals indicative of the respective measured temperatures are transmitted along wires 143b and 143a respectively to the programmable thermostatic control 145.

When the thermodynamic motor drives a rotationally driven unit 49, such as an electrical generator or alternator, which must be driven within a prescribed range of revolutions per minute (RPM), the thermostatic control 145 is appropriately programmed with input values indicative of the prescribed RPM range and, where applicable, the effective step-up ratio contributed by the intermediate pulley(s). The thermostatic control 145 then computes the rotational velocity of the motor which is needed to drive the unit 49 within its prescribed RPM range. Moreover, since the speed of the motor is dependent upon the temperature differential between the heating means (such as 53) and the air surrounding the cooling means (such as near 123), the thermostatic control 145 further computes the temperature differential necessary to produce the desired motor speed.

Upon receiving the measured temperature signals on wires 143b and 143a, the thermostatic control 145 checks to determine if the necessary temperature differential is being maintained. If the temperature differential is not great enough, the thermostatic control 145 checks signals being monitored on wires 143d and 143c to determine if the temperature of the water contained in water source 111 or the storage tank 119 is not enough to produce the necessary temperature differential. If so, the control 145 activates the pump 115 by sending an enabling signal on line 148. If not, the control 145 first activates a heating element (not shown) in the source 111 until the temperature of the water contained therein is sufficiently hot and thereafter activates the pump 115.

If the measured temperature differential is too great, the thermostatic control 145 activates a pump, such as pump 129 shown in FIG. 2, for operating the cooling means (such as sprayer 123). Either alternatively or additionally, the control 145 may also activate pump 115 to circulate into the tub 53 cooler water if cooler water is known (via signals on lines 143d and 143c) to be currently contained in either water source 111 or storage tank 119. Thus, in the above manner, the thermodynamic motor is controlled to rotate at a velocity which ultimately drives the rotatably driven unit 49 within a prescribed RPM range.

While the invention has been particularly shown and described with reference to the preferred embodiments thereof, it will be understood by those skilled in the art that various alterations in form and detail may be made therein without departing from the spirit and scope of the invention. For example, any number of intermediate pulleys may be connected between the motor frame 21 and the rotationally driven unit 49 for stepping up the rotational velocity.

The embodiments of the invention in which an exclusive property or privilege is claimed are defined as follows:

1. A thermodynamic motor and pulley system comprising:
   an essentially cylindrical frame rotatable about a horizontal axis, said frame having an essentially vertical cross section, said horizontal axis extending through the center of said frame vertical cross section;
   a plurality of oppositely disposed pairs of containers mounted on said frame, each of said containers having an essentially rectangular vertical cross section, wherein a larger dimension of said rectangular vertical cross section is oriented essentially tangentially with respect to said cylindrical frame, a smaller dimension of said rectangular vertical cross section is oriented essentially orthogonally to said larger dimension, and an axial dimension of said container is oriented essentially parallel to said axis, and wherein
      the ratio of the length of said larger dimension to the length of said smaller dimension of said vertical cross section of said container is between 3:1 and 1:1; and,
      the ratio of the length of said axial dimension to the length of said smaller dimension of said vertical cross section of said container is between 1:5 and 1:15;
   at least one tube interconnecting each oppositely disposed pair of containers;
   a volatile liquid substantially filling at least one container of each pair;
   means to effect a temperature differential between the containers in each pair to cause said volatile liquid in one such container to transfer through said interconnecting tube to the other container paired therewith, thereby shifting the center of gravity of said pair of containers about said axis to cause the rotational motion of said frame; and,
   transmission means extending semi-circumferentially around said frame, said transmission means being ultimately connected to a rotationally driven member, said transmission means being adapted to transmit the rotational motion of said frame to said rotationally driven member.

2. A thermodynamic motor and pulley system comprising:
   an essentially cylindrical frame rotatable about a horizontal axis, said frame having an essentially vertical cross section, said horizontal axis extending through the center of said frame vertical cross section;
   a plurality of oppositely disposed pairs of containers mounted on said frame, each of said containers having a vertical cross section defined by
   (1) first arc $A_1$ having a radius $R_1$, the center of arc $A_1$ being said axis;
   (2) a second arc $A_2$ having a radius $R_2$, $R_2$ being greater than $R_1$, the center of arc $A_2$ being said axis;
   (3) a first essentially radial segment $S_1$ connecting an end of said first arc $A_1$ to an end of said second arc $A_2$; and
   (4) a second essentially radial segment $S_2$ connecting an end of said first arc $A_1$ to an end of said second arc $A_2$, each of said containers having a smaller dimension equal in length to the perpendicular distance between segment $S_1$ and $S_2$, a larger dimension equal in length to the average of the lengths of first arc $A_1$ and second arc $A_2$, and an axial dimension parallel to said axis, and wherein the ratio of the length of said larger dimension of said vertical cross section to the length of said smaller dimension of said container is between 3:1 and 1:1; and the ratio of the length of said axial dimension to the length of said smaller dimension of said vertical cross section of said container is between 1:5 and 1:15;

at least one tube interconnecting each oppositely disposed pair of containers;

a volatile liquid substantially filling at least one container of each pair;

means to effect a temperature differential between the containers in each pair to cause said volatile liquid in one such container to transfer through said interconnecting tube to the other container paired therewith, thereby shifting the center of gravity of said pair of containers about said axis to cause the rotational motion of said frame; and, transmission means extending semi-circumferentially around said frame, said transmission means being ultimately connected to a rotationally driven member, said transmission means being adapted to transmit the rotational motion of said frame to said rotationally driven member.

3. The apparatus of claims 1 or 2, wherein said frame extends across an axial direction, and wherein a plurality of said containers are positioned in spaced relationship across the axial direction of said frame.

4. The apparatus of claim 3, wherein said plurality of containers are spaced apart in the axial direction so as to permit at least one of said tubes to pass between containers which are axially adjacent.

5. The apparatus of claims 1 or 2, wherein said container is selectively mountable and removable from said frame.

6. The apparatus of claim 5, wherein said container is fastened onto said frame by at least one strapping means.

7. The apparatus of claims 1 or 2, wherein said frame comprises an essentially cylindrical inner frame member and an essentially cylindrical outer frame member, said inner and outer frame members both being concentric to said axis, said containers mounted between said inner and said outer frame members.

8. The apparatus of claim 7 wherein said container is fastened by at least one strapping means onto said inner frame member so that said container is selectively mountable and removable by disengaging said strapping means.

9. The apparatus of claim 7, wherein said inner frame member and said outer frame member are connected by a plurality of pairs of braces, each pair of braces extending essentially in a radial direction with respect to said axis from said inner frame member to said outer frame member, the braces in each pair being connected by a retaining means which extends substantially across the entire axial dimension of said frame, said retaining means serving to prevent said containers from slippage in a circumferential direction around said frame.

10. A thermodynamic motor and pulley system comprising:

a frame rotatable about a horizontal axis;

a plurality of oppositely disposed pair of containers mounted on said frame, each container having a first surface nearest said axis and a second surface oppositely disposed to said first surface;

at least one tube interconnecting each oppositely disposed pair of containers, said interconnecting tube communicating with each of said containers at said second surface thereof, said interconnecting tube traveling in an essentially U-shaped path commencing at a point of communication on said second surface and continuing around said container in a direction toward said axis and toward the oppositely disposed container in said pair;

a volatile liquid substantially filling at least one container of each pair;

means to effect a temperature differential between the containers in each pair to cause said volatile liquid in one such container to transfer through said interconnecting tube to the other container paired therewith, thereby shifting the center of gravity of said pair of containers about said axis to cause the rotational motion of said frame; and, transmission means adapted to transmit the rotational motion of said frame to a rotationally driven member.

11. The apparatus of claim 10 wherein said interconnecting tube comprises a transparent portion where said tube communicates with each container, and wherein said transparent portion has a visible marking thereon for indicating a level of said volatile liquid in said container.

* * * * *